A. KINGSBURY.
THRUST BEARING.
APPLICATION FILED MAY 20, 1907.
947,242.
Patented Jan. 25, 1910.
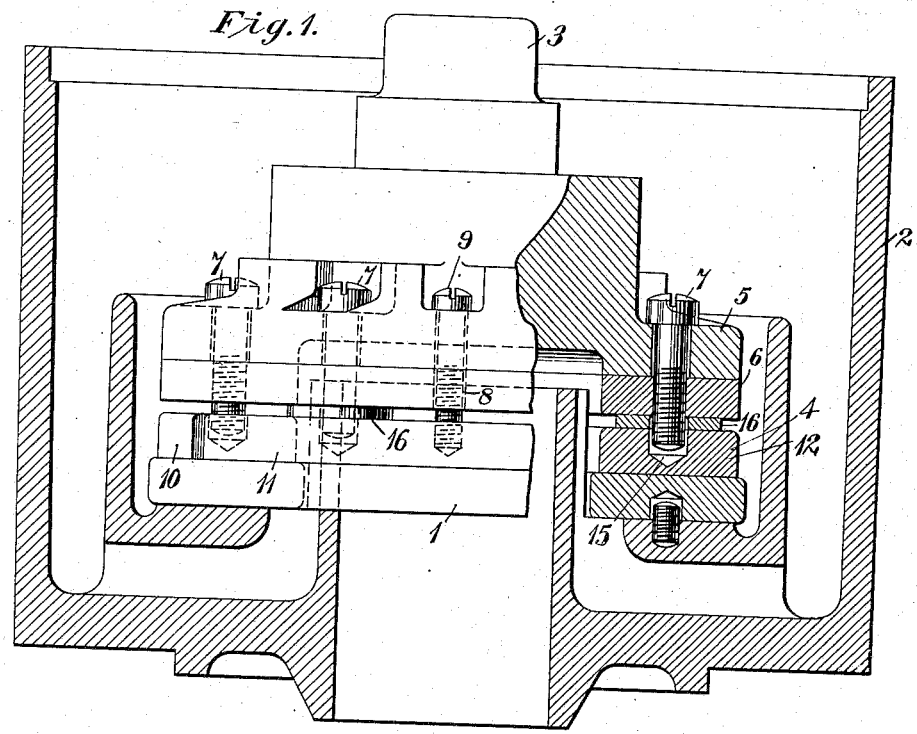
Fig. 1.
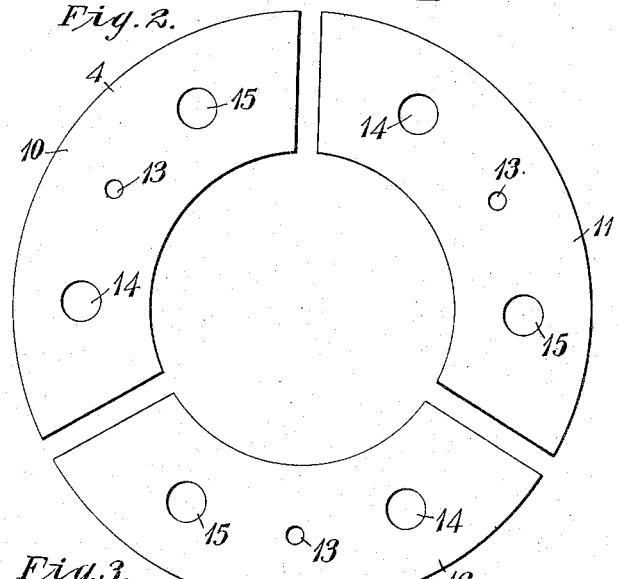
Fig. 2.
Fig. 3.
WITNESSES:
Fred H Miller
R J Dearborn
INVENTOR
Albert Kingsbury
BY
Wesley G. Carr
ATTORNEY

UNITED STATES PATENT OFFICE.

ALBERT KINGSBURY, OF PITTSBURG, PENNSYLVANIA.

THRUST-BEARING.

947,242.

Specification of Letters Patent.  Patented Jan. 25, 1910.

Application filed May 20, 1907. Serial No. 374,748.

*To all whom it may concern:*

Be it known that I, ALBERT KINGSBURY, a citizen of the United States, and a resident of Pittsburg, in the county of Allegheny and State of Pennsylvania, have invented a new and useful Improvement in Thrust-Bearings, of which the following is a specification.

My invention relates to thrust bearings which are adapted to sustain relatively high pressures between the friction surfaces, and it has for its object to provide a bearing of the aforesaid class that shall be simple and durable in construction and that shall automatically maintain a film of lubricating fluid between the coöperating friction surfaces.

In the prior art, difficulties have been experienced in adequately lubricating bearing surfaces between which relatively high pressures existed. This was particularly true when the bearings comprised plane engaging surfaces, such as are employed for supporting the rotatable members of machines or devices having vertical shafts.

My improved thrust bearing is so constructed that the lubricating fluid which is supplied thereto is automatically and continuously forced, in operation, from a relatively low to a high pressure portion of the bearing.

An embodiment of my invention is illustrated in the accompanying drawings, in which—

Figure 1 is a sectional elevation of an assembled bearing the details of which are illustrated in Figs. 2 and 3.

Referring to the drawings, the device illustrated therein comprises a stationary ring bearing member 1, a supporting frame 2, a rotatable shaft 3 and a segmental ring bearing member 4. The end of the shaft 3 is enlarged and its center portion is bored out so that an annular projection 5 is formed, the dimensions of which substantially correspond to the upper surface of the ring bearing member 1. Another ring member 6 is attached to the annular projection 5 by bolts 7 which are uniformly disposed about the center of the shaft and the ends of which project axially from the surface of the ring 6. A plurality of holes 8 are drilled through the annular projection 5 and the ring 6, midway between the bolts 7, and bolts 9 are fitted loosely in these holes. The segmental ring 4 comprises a plurality of similar parts 10, 11 and 12 which constitute bearing shoes and are provided with tapped holes 13 at their middle points to receive the bolts 9 and each of the sections is further provided with holes 14 and 15 into which the extremities of the bolts 7 are adapted to fit loosely, thereby forming pivotal connections between the shoes and the end of the shaft 3. None of the holes 13, 14 and 15 extend entirely through the segments of the ring 4 so that the outer surface of this ring is perfectly plane and is adapted to engage the stationary ring bearing member 1, the relative position of the several ring segments being maintained by the projecting bolts 7 and 9.

Although the ring 4 is divided, as illustrated, into three segments, any suitable number of segments may be employed each of which will be attached to the annular projection 5 by machine bolts passing loosely through holes that are uniformly disposed about the axis of the shaft. Two guide bolts 7 will be provided for each segment of the ring 4 and their extremities will extend into the holes in the ring segments that are located between the point of support and the end of the segments. Inasmuch as the bearing segments are loosely supported they will seat themselves without careful workmanship and adjustment.

In operation, spacing washers 16 are interposed between the ring 5 and the segments of the ring 4. These washers are located at corresponding ends of the ring segments and are held in position by the bolts 7 about which they are loosely assembled. The end of the segments at which the washers are located depends upon the direction of rotation of the shaft, the object being to provide the maximum pressure, in operation, between the rear of each segment and the stationary ring bearing 1. For example, referring to Fig. 2, which is a view looking along the shaft toward its end, washers will be located near the holes 14 for clockwise rotation of the shaft and near the holes 15 for a counter-clockwise rotation.

Since the faces of the washers are parallel and the lower surface of the ring 5 and the surfaces of the segments 4 are planes, the entire lower surface of the segmental ring 4 will engage the upper surface of the ring 1 but the greater pressure will obviously exist directly under the washers. Consequently, lubricating fluid which may be supplied to the bearing will flow with comparative ease between the portion of the surfaces where the pressure is relatively low and, as the shaft rotates, this film of lubricating fluid will force itself between the portions of the surfaces where the high pressure exists.

The stationary support 2 may preferably be cup-shaped, or of other convenient form, so that the bearing may be submerged in the lubricating fluid. The friction surface of the bearing illustrated may be operated either in a horizontal or in a vertical plane, the lubricating fluid-containing chamber being suitably modified in accordance with the operating conditions. The spacing washers 16 may preferably be made of brass or other relatively soft material, while the friction surfaces may respectively be made of materials of different hardness, such as hardened steel and a composition of copper.

It will, of course, be readily understood that it is immaterial to my invention whether the ring segments or shoes are secured to the stationary or to the rotating part of the bearings, and I desire that variations in size and arrangement of details which do not depart from the spirit of my invention shall be included within its scope.

I claim as my invention:

1. A thrust bearing comprising relatively rotatable members, and a plurality of radial shoes interposed between said members and pivotally attached to one of them.

2. A thrust bearing comprising relatively rotatable members, and a segmental ring the parts of which are pivotally attached to one of said members and are adapted to make frictional engagement with the other member.

3. A thrust bearing containing relatively rotatable members, a segmental ring the parts of which are pivotally supported near their middle points by one of said members and are adapted to make frictional engagement with the other member, and spacers interposed between the ring segments and the member by which they are supported.

4. A thrust bearing comprising a shaft and a supporting member therefor, one of said parts being rotatable and the other stationary, a plurality of radial bearing shoes interposed between the shaft and the supporting member, and spacing means between the bearing shoes and one of the adjacent parts.

5. The combination with a rotary shaft, of a plurality of ring segments, means for loosely attaching substantially the middle points of said segments to one end of the shaft, pins projecting from the end of the shaft to engage holes in the ends of the ring segments and maintain the relative positions of said segments, a stationary member having a plane surface adapted to make frictional engagement with the ring segments, and spacing washers which are held in position by the said projecting pins and are interposed between the end of the shaft and a corresponding end of each ring segment.

6. In a thrust bearing, the combination with a stationary ring bearing member, of a rotatably mounted shaft having a plane end surface, ring segments adapted to engage the stationary ring bearing member and having their middle points loosely attached to the end surface of the shaft, guide pins projecting from the end surface of the shaft and fitting loosely into the holes near the ends of the ring segments, and spacing washers fitted upon the guide pins and interposed between the end surface of the shaft and the rear end of each ring segment, according to the direction of shaft rotation.

7. A thrust bearing comprising a rotatable member, a segmental ring the parts of which are loosely attached thereto, and a complementary stationary member adapted to make frictional engagement with the segmental ring.

8. A thrust bearing comprising a rotary shaft, a plurality of ring segments having their middle points loosely attached to one end of said shaft, a stationary member having a surface adapted to make frictional engagement with the ring segments, and spacers interposed between the ring segments and the end of the shaft.

In testimony whereof, I have hereunto subscribed my name this 13th day of May, 1907.

ALBERT KINGSBURY.

Witnesses:
 JENS BACHE-WÜG,
 BIRNEY HINES.